United States Patent
Ge et al.

(10) Patent No.: US 10,790,775 B2
(45) Date of Patent: Sep. 29, 2020

(54) ELECTRIC DRIVE FOR ELECTRIC VEHICLES

(71) Applicant: Ford Global Technologies, LLC, Dearborn, MI (US)

(72) Inventors: Baoming Ge, Okemos, MI (US); Lihua Chen, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 49 days.

(21) Appl. No.: 16/265,429

(22) Filed: Feb. 1, 2019

(65) Prior Publication Data
US 2020/0252020 A1 Aug. 6, 2020

(51) Int. Cl.
| | |
|---|---|
| H02P 27/08 | (2006.01) |
| B60L 50/60 | (2019.01) |
| B60L 50/51 | (2019.01) |
| B60L 15/20 | (2006.01) |
| H02M 7/5395 | (2006.01) |

(52) U.S. Cl.
CPC .............. H02P 27/08 (2013.01); B60L 15/20 (2013.01); B60L 50/51 (2019.02); B60L 50/60 (2019.02); *B60L 2210/40* (2013.01); *B60L 2240/423* (2013.01); *H02M 7/5395* (2013.01)

(58) Field of Classification Search
CPC ................................. H02P 27/08; B60L 50/60
USPC ........................................................ 318/139
See application file for complete search history.

(56) References Cited

U.S. PATENT DOCUMENTS

| | | | |
|---|---|---|---|
| 4,998,054 A | | 3/1991 | Bose et al. |
| 5,594,634 A | * | 1/1997 | Rajashekara ....... H02M 5/4585 |
| | | | 363/132 |
| 6,469,469 B1 | * | 10/2002 | Chambers ............... H02P 23/08 |
| | | | 318/801 |
| 7,142,439 B2 | | 11/2006 | Oh |
| 2012/0229061 A1 | * | 9/2012 | Itoh ........................ B60L 50/51 |
| | | | 318/400.3 |

OTHER PUBLICATIONS

Gregory L. Fronista, An Induction Motor Drive Using a Resonant DC Link Inverter, Power Components Branch, Aerospace Division, Wright Laboratory, Wright Patterson Air Force Base, Ohio, Feb. 1996, 73 pgs.

* cited by examiner

*Primary Examiner* — Erick D Glass
(74) *Attorney, Agent, or Firm* — David B. Kelley; Brooks Kushman P.C.

(57) ABSTRACT

A vehicle includes an inverter having first and second half bridges configured to provide multiphase voltage to an electric machine. The vehicle further includes a controller configured to activate a switch of the first half bridge and pulse width modulate a switch of the second half bridge to conduct resonant output on a rail of the inverter to the electric machine such that the multiphase voltage is created for at least a sixth of a cycle of the electric machine. The activation is responsive to a torque command.

16 Claims, 4 Drawing Sheets

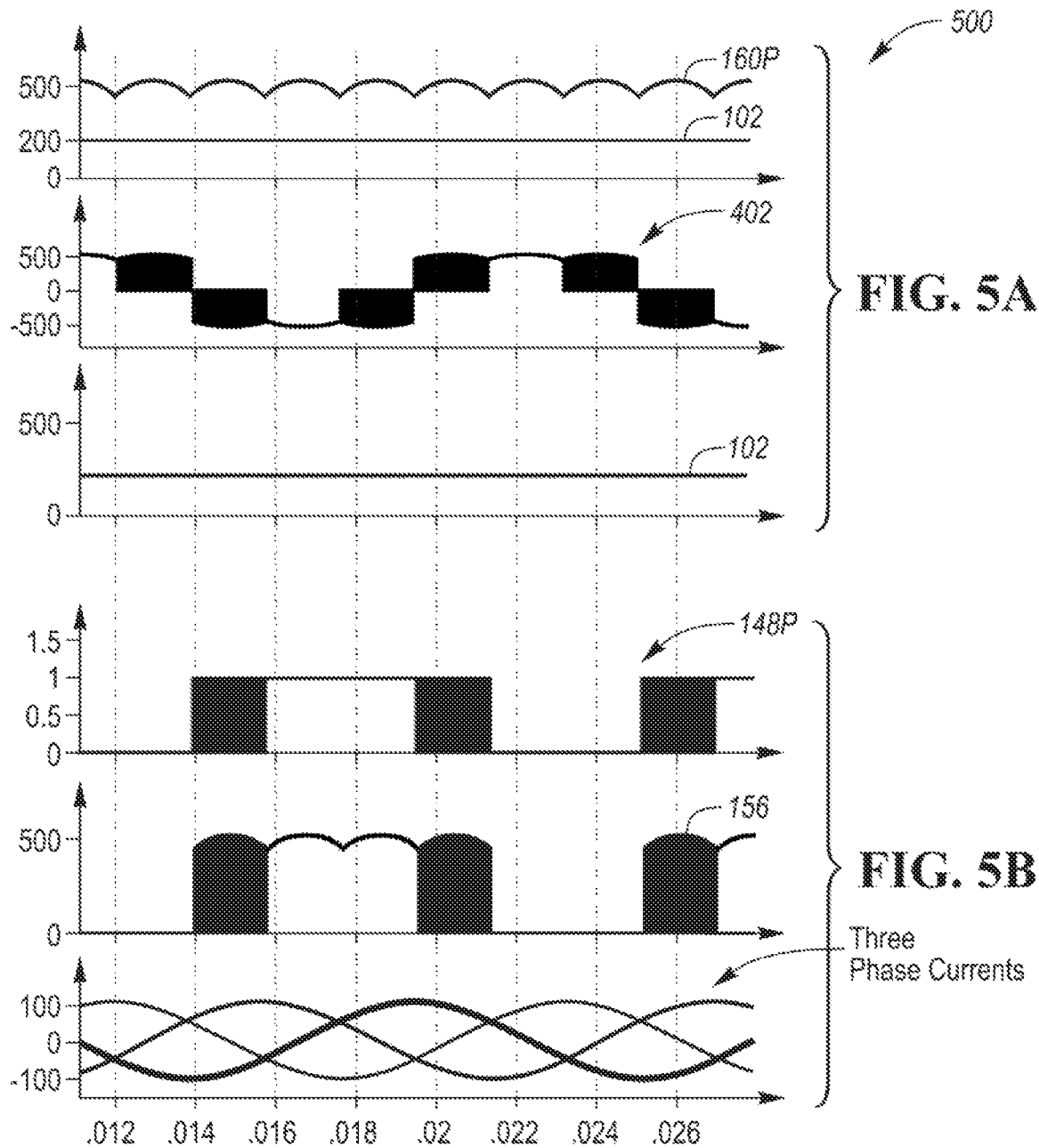

ELECTRIC DRIVE FOR ELECTRIC VEHICLES

TECHNICAL FIELD

This disclosure relates to electric drives for electric machines of vehicles.

BACKGROUND

Direct current to AC inverters can be configured to drive and operate electric machines. Pulse width modulation signals may drive solid state switches of the inverters to operate the electric machines. Continuous switching activation causes losses that increase power consumption and heat generation.

SUMMARY

A vehicle includes an inverter having first and second half bridges configured to provide multiphase voltage to an electric machine. The vehicle further includes a controller configured to activate a switch of the first half bridge and pulse width modulate a switch of the second half bridge to conduct resonant output on a rail of the inverter to the electric machine such that the multiphase voltage is created for at least a sixth of a cycle of the electric machine. The activation is responsive to a torque command.

A vehicle includes a variable voltage converter configured to drive resonant output to upper and lower rails of an inverter that is configured to provide power to an electric machine. The vehicle includes a controller configured to operate a switch of the variable voltage converter such that a frequency of the resonant output is six times the angular frequency. The operation is responsive to receiving an angular frequency of the electric machine.

A method includes generating multiphase voltage for an electric machine for at least a sixth of a cycle of the electric machine by activating a switch of a first half bridge of an inverter and pulse width modulating a switch of the second half bridge of the inverter to conduct resonant output on a rail of the inverter to the electric machine. The generation is responsive to a torque command.

BRIEF DESCRIPTION OF THE DRAWINGS

FIG. 5A is a graph depicting high voltage operation of the power transmission system; and FIG. 5B is a graph depicting switch operations of the inverter and multiphase output of the inverter.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Electric and hybrid vehicle powertrains include battery modules and electric machines. Direct current stored in the battery module is inverted via an inverter to operate the electric machine. The inverter is configured to change the angular frequency of the electric machine via pulse width modulations. The pulse width modulations may operate gate drivers on solid state switches (e.g., IGBT) to variably allow current to flow from the battery to the electric machine. In order to increase performance, a variable voltage converter ("VVC") may be used to step-up battery voltage to rails of the inverter. The present disclosure also includes a VVC that can be used to step-down battery voltage to rails of the inverter. As such, energy consumption can be tailored to the necessary rail voltage of the inverter.

The VVC may be further configured to output a resonant voltage. That is, a voltage that resonates (e.g., having a frequency) according to a speed of the electric machine. For example, a VVC having a resonant output of 36 Hz would properly supply an electric machine that is wound in three-phase and is operated at an angular frequency of 6 Hz. The switches of the converter may be configured to conduct the resonant output directly or indirectly to the electric machine. That is, the resonant output directly drives the machine for at least part of the switching cycle. And indeed, switching losses may be reduced by decreasing the average switching frequency.

Figure 1:
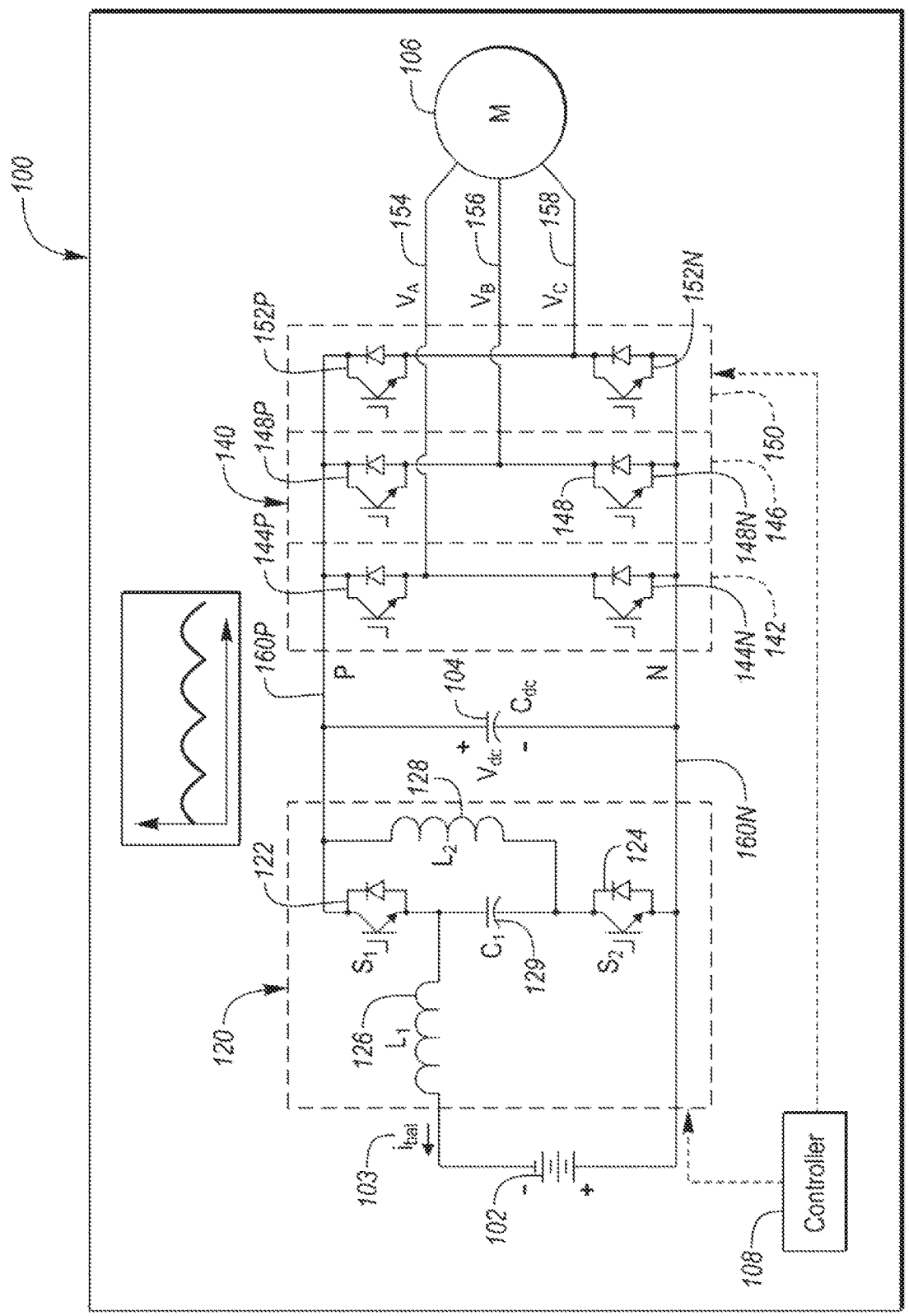
FIG. 1 is a schematic of a power transmission system for an electric vehicle.

Referring to FIG. 1, a vehicle 100 is shown. The vehicle 100 includes a battery 102 and electric machine 106. The battery 102 is connected to a variable voltage converter (VVC) 120. The VVC 120 includes a modified buck-boost converter having two inductors 126, 128, a capacitor 129, and a pair of switches 122, 124 arranged in a modified half bridge. The VVC includes a positive resonant output 160P and a negative resonant output 160N. One of the resonant outputs 160P and 160N may intermittently resonate or not resonate at all. Additionally, the negative resonant output may resonate as an inverted pattern with respect to the positive resonant output. A frequency of the resonant output 160P, 160N of the VVC 120 is determined by pulse width modulation by the controller 108 that is configured to drive gates of the switches 122, 124. The duty cycle of the switches of the VVC are equal to Equation (1).

$$D_{VVC} = \frac{V_b + V_{dc}}{V_b + 2V_{dc}} \quad (1)$$

The vehicle 100 includes a DC link capacitor 104. The DC link capacitor 104 may have a sufficiently small capacitance to ensure the resonance is not diminished while having a sufficiently large capacitance to limit voltage drops.

The vehicle 100 includes an inverter 140 that includes half bridges 142, 146, 150 for each phase 154, 156, 158. Each of the half bridges 142, 146, 150 include switches 144P, 144N, 148P, 148N, 152P, 152N each corresponding to respective connections with the positive rail 160P or negative rail 160N. Thus, each of the switches is configured to conduct respective resonant outputs to respective phases 154, 156, 158 to provide a multiphase voltage to the electric machine 106.

The controller 108 may include various drivers, buffers, and analog circuits to energize gates of the switches 144P, 144N, 148P, 148N, 152P, 152N. The switches 144P, 144N, 148P, 148N, 152P, 152N may be driven by a pulse width modulation signal configured to generate the require portions of a sinusoidal waveform. The controller 108 may include reference carrier waveforms to generate the proper output.

Figure 2:
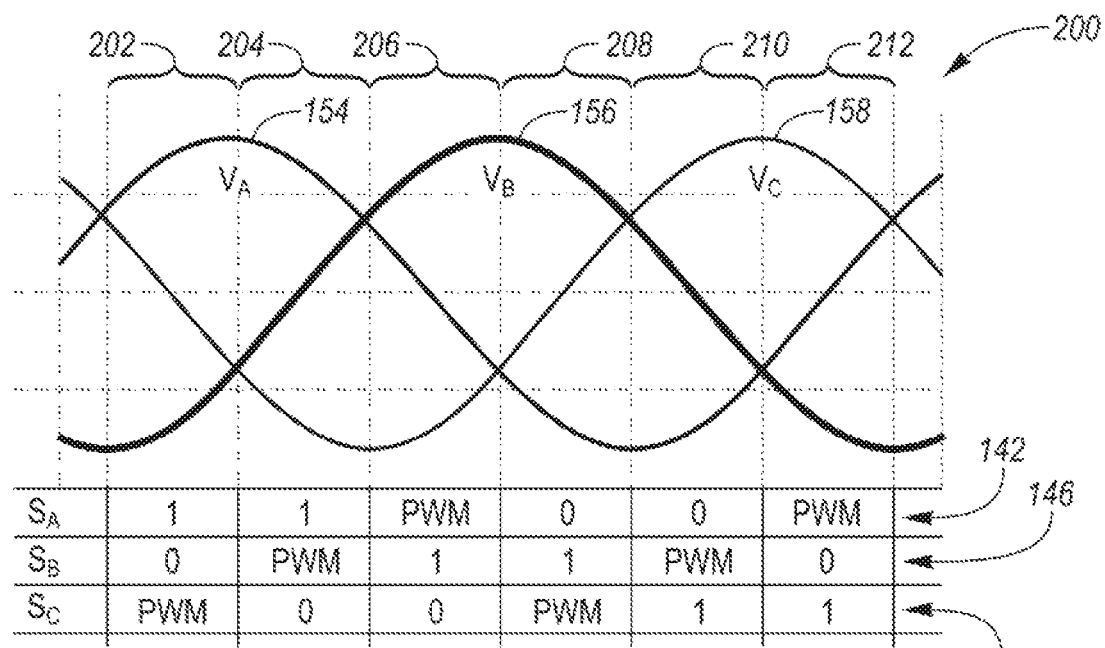
FIG. 2 is a graph depicting a multiphase output of an electric machine and half bridge states for the electric machine.
Figure 3:
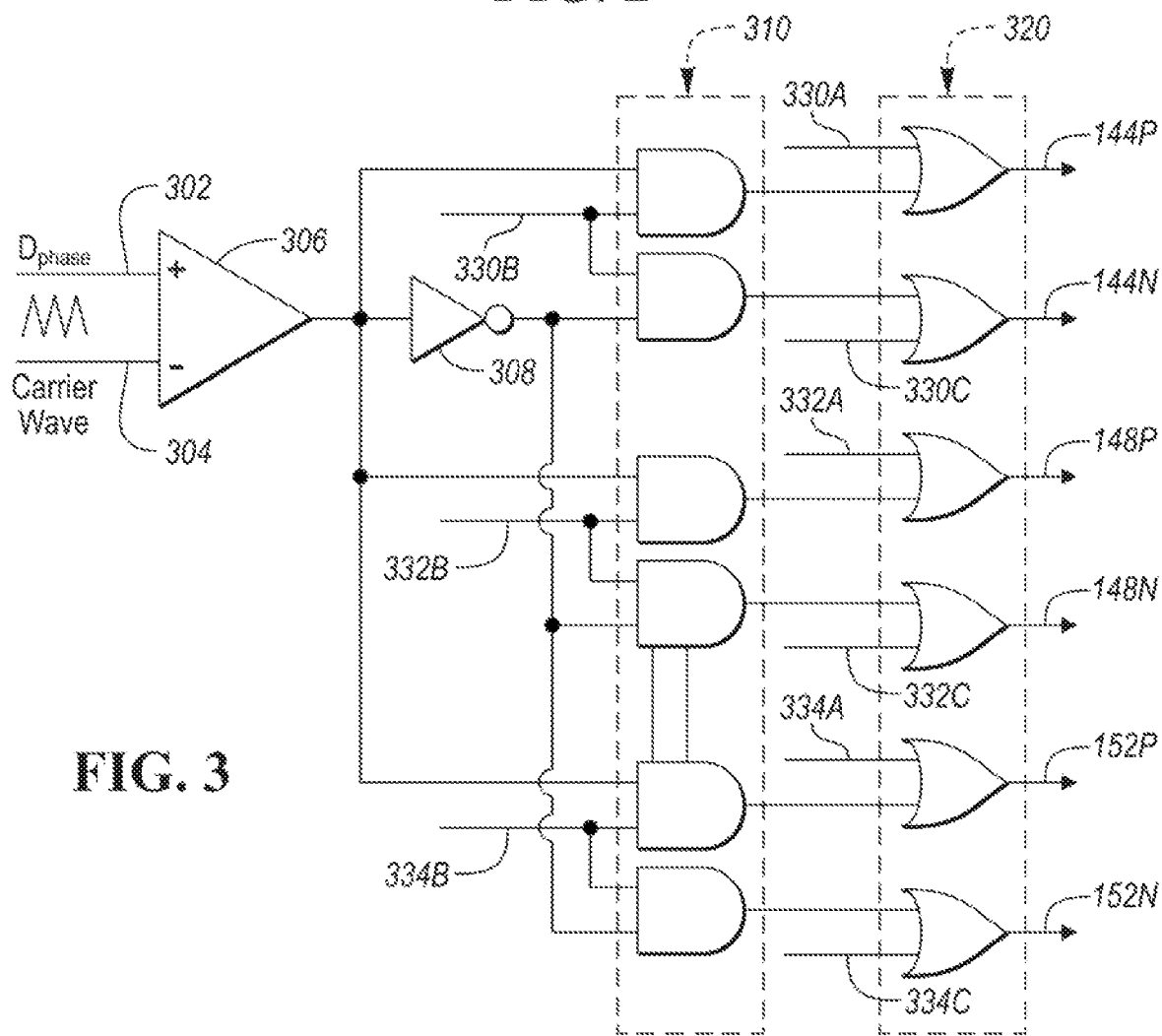
FIG. 3 is a logic algorithm for switches of the inverter.

Referring to FIGS. 2 and 3, a graph 200 is shown. The graph 200 includes three-phase or multiphase voltages 154, 156, 158 provided to the electric machine 106. One fundamental cycle of the electric machine 106 is divided into six sectors 202, 204, 206, 208, 210, 212. That is, one cycle of one of the phases 154, 156, 158 is equal to one entire cycle of the electric machine. For the first two sixths 202, 204, half bridge 142 is denoted as being "1" (i.e., ON). That is, switch 144P is ON, and switch 144N is OFF such that the phase voltage 154 is directly from the positive rail 160P and creates waveform 154. For the first sixth 202, as shown, half bridge 146 is denoted as being "0" (i.e., OFF). That is, switch 148P is OFF and switch 148N is ON such that the phase voltage 156 is directly from the bottom rail 160N and creates waveform 156 or a direct voltage reference from 160N if the output from VVC 120 to rail 160N is not resonant. In addition, the half bridge 150 is denoted as being "PWM", which means for the first sixth 202 both switches 152P, 152N are operated according to a pulse width modulation schedule based on a sawtooth carrier wave and a modified sinusoidal reference voltage based on Equation 2.

$$D_C = \frac{v_C - v_B}{v_A - v_B}, \quad (2)$$

where the duty cycle, $D_C$, of the PWM generates phase voltage 158 from half bridge 150, the duty cycle to form the first sixth 202 of the electric machine 106 fundamental cycle. Similarly, the other half bridges 142, 146 also operate on duty cycles according to Equation 3 which is a general equation to calculate duty cycles for three phase legs.

$$D_{phase} = \frac{v_A S_{A2} + v_B S_{B2} + v_C S_{C2} - (v_A S_{A3} + v_B S_{B3} + v_C S_{C3})}{v_{dc}}, \quad (3)$$

where the duty cycle of the phase, $D_{phase}$, specified in FIG. 3. Parameters $S_{A2}$ 330B, $S_{B2}$ 332B, $S_{C2}$ 334B are determined by respective comparisons to $v_A$ 154, $v_B$ 156, $v_C$ 158. For example, if the amplitude of the phase voltage is $v_m$, $v_A$ 154 may be compared with 0.5 $v_m$ and −0.5 $v_m$. With only one of the $S_{A1}$ 330A, $S_{A2}$ 330B, $S_{A3}$ 330C values being true at one time, a $v_A$ greater than 0.5 $v_m$ could result in $S_{A1}$ being TRUE and $S_{A2}$, $S_{A3}$ being FALSE.

That is, for at least a sixth of a cycle of the electric machine 106 receives unaltered electricity from the positive resonant output 160P of the VVC 120 through a circuit formed by switches 144P, 144N and pulse width modulated electricity from the VVC 120 through a circuit formed by switches 148P, 148N. Additionally, the electric machine 106 may receive unaltered electricity from the negative resonant output 160N of the VVC 120 through a circuit formed by switches 152P, 152N, as shown via the logic of FIG. 3.

Figures 4A, 4B, 4C:
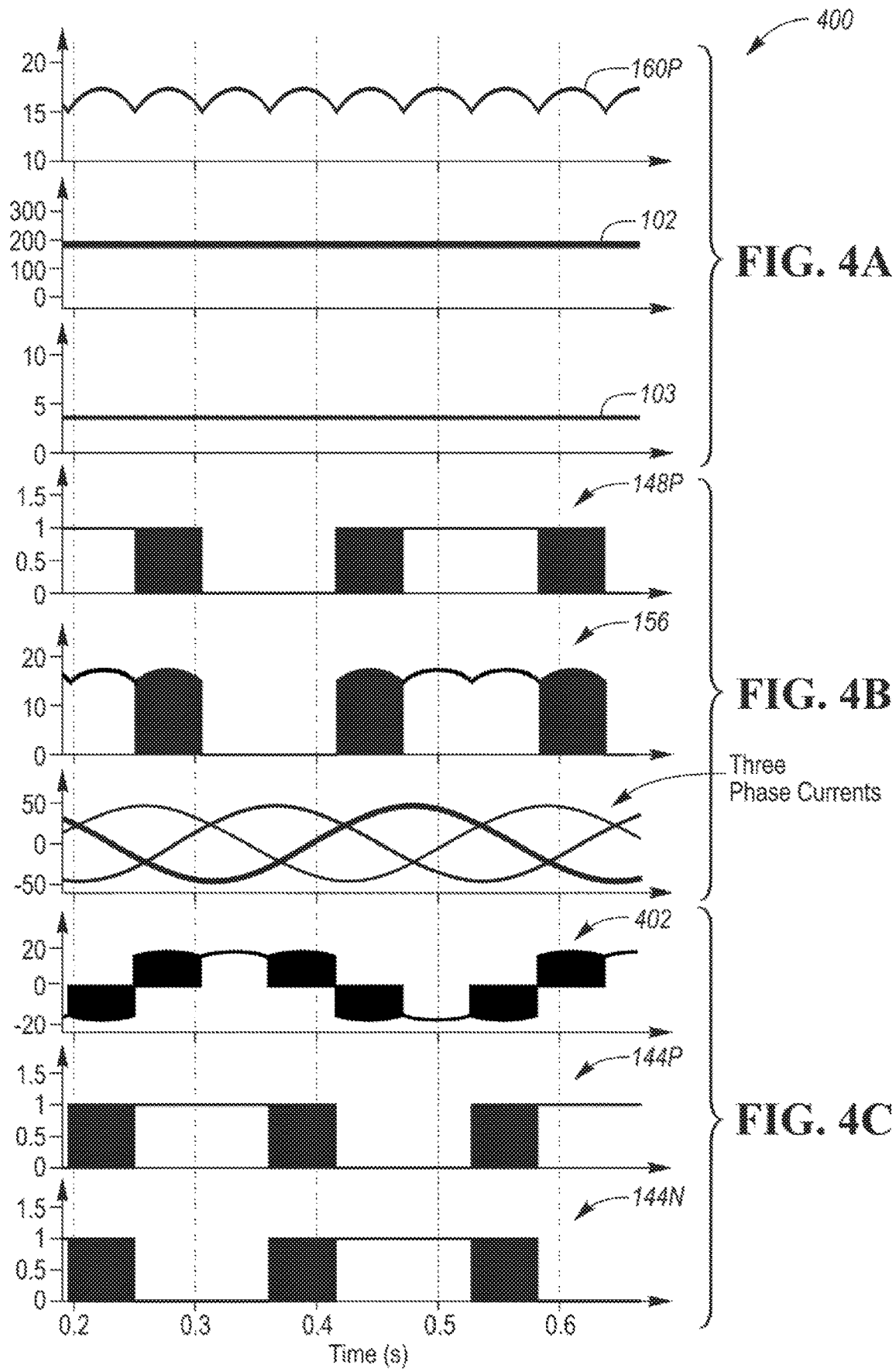
FIG. 4A is a graph depicting low voltage operation of the power transmission system.
FIG. 4B is a graph depicting output phase voltage, currents, and switch operations of the inverter.
FIG. 4C is a graph depicting output phase-phase voltage and switch operations of the inverter.

Referring to FIGS. 4A-C, a plurality of operating conditions 400 are shown over time. In FIG. 4A, the resonant output 160P is shown have a RMS voltage of around 16 V. The battery voltage 102 is shown having a voltage under 200 V. The inductor L1 or battery current 103 is shown near 5 A. As shown in FIG. 4B, the upper switch 148P has an ON period during first sixth and a pulse width modulation during the second sixth. That is, the solid line for the first sixth indicates that the switch is on and the shaded area of the second sixth shows that the switch is operated under pulse width modulation. That is the upper switches gate signal is shown. Additionally, the output voltage of phase B, $V_B$ 156, is shown having a resonant value for the first sixth while the switch is ON, and a pulse width modulated value while the switch 148P is pulse width modulated. Indeed, the three-phase signal is shown as outputted by switches for the inverter following a similar scheme. Similarly, the gate signals for switches 144P, 144N are shown. The gate signals are offset to indicate that for different sixths of the cycle the switches 144P, 144N are ON or pulse width modulated.

Referring to FIGS. 5A-B, a similar plurality of circumstances is shown for high voltage operation. In FIG. 5A, the resonant output 160P is shown have a RMS voltage of around 500 V. The battery voltage 102 is shown having a voltage under 200 V. As shown in FIG. 5B, the upper switch 148P has an OFF period during first and second sixth and a pulse width modulation during the third sixth. The gate signal for the upper switch 148P is shown. That is, the solid line for the first sixth indicates that the switch is off and the shaded area of the third sixth shows that the switch is operated under pulse width modulation. Additionally, the output voltage of phase B, $V_B$ 156, is shown having a resonant value for the fourth and fifth sixth while the switch is ON, and a pulse width modulated value while the switch 148P is pulse width modulated. Indeed, the three-phase signal is shown as outputted by switches for the inverter following a similar scheme.

The words used in the specification are words of description rather than limitation, and it is understood that various changes may be made without departing from the spirit and scope of the disclosure. As previously described, the features of various embodiments may be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. A vehicle comprising:
an inverter including first and second half bridges configured to provide multiphase voltage to an electric machine; and
a controller configured to, responsive to a torque command, activate a switch of the first half bridge and pulse width modulate a switch of the second half bridge to conduct resonant output on a rail of the inverter to the electric machine such that the multiphase voltage is created for at least a sixth of a cycle of the electric machine.

2. The vehicle of claim 1, wherein the inverter further includes a third half bridge configured to provide an additional offset phase of the multiphase voltage is further configured to, responsive to the torque command, close a switch of the third half bridge to conduct resonant output from a rail of the inverter to the electric machine.

3. The vehicle of claim 1, wherein a duty cycle of the pulse width modulated switch is equal to a ratio of a voltage of a one of multiphase voltage less a voltage of an other of the multiphase voltage and a voltage of a third phase of multiphase voltage less the voltage of the other.

4. The vehicle of claim 1, wherein the resonant output is driven by switches of a variable voltage converter.

5. The vehicle of claim 4, wherein a one of the switches of the variable voltage converter has a duty cycle ($D_{VCC}$) based on a battery voltage ($V_b$) associated with the inverter and a DC link capacitor voltage ($V_{DC}$) associated with the inverter.

6. The vehicle of claim 5, wherein $$D_{VVC} = \frac{V_b + V_{DC}}{V_b + 2V_{DC}}.$$

7. The vehicle of claim 6, wherein $V_{DC}$ is equal to a voltage of a one of multiphase voltage less a voltage of an other of the multiphase voltage.

8. The vehicle of claim 1, wherein a frequency of the resonant output is six times an angular frequency of the electric machine.

9. A vehicle comprising:
a variable voltage converter configured to drive resonant output to upper and lower rails of an inverter that is configured to provide power to an electric machine; and
a controller configured to, responsive to receiving an angular frequency of the electric machine, operate a switch of the variable voltage converter such that a frequency of the resonant output is six times the angular frequency.

10. The vehicle of claim 9, wherein the controller is further configured to, responsive to a torque command, activate a switch of a first half bridge of the inverter and pulse width modulate a switch of a second half bridge of the inverter to conduct resonant output on a rail of the inverter to the electric machine such that the multiphase voltage is created for at least a sixth of a cycle of the electric machine.

11. The vehicle of claim 10, wherein the inverter further includes a third half bridge configured to provide an additional offset phase of the multiphase power is further configured to, responsive to the torque command, close a switch of the third half bridge to conduct resonant output from a rail of the inverter to the electric machine.

12. The vehicle of claim 11, wherein a duty cycle of the pulse width modulated switch is equal to a ratio of a voltage of a one of multiphase voltage less a voltage of an other of the multiphase voltage and a voltage of a third phase of multiphase voltage less the voltage of the other.

13. The vehicle of claim 12, wherein a one of the switches of the variable voltage converter has a duty cycle ($D_{VCC}$) based on a battery voltage ($V_b$) associated with the inverter and a DC link capacitor voltage ($V_{DC}$) associated with the inverter.

14. The vehicle of claim 13, wherein $$D_{VVC} = \frac{V_b + V_{DC}}{V_b + 2V_{DC}}.$$

15. The vehicle of claim 14, wherein $V_{DC}$ is equal to a voltage of the one phase less the voltage of the other phase of the multiphase voltage.

16. A method comprising:
responsive to a torque command, generating multiphase voltage for an electric machine for at least a sixth of a cycle of the electric machine by activating a switch of a first half bridge of an inverter and pulse width modulating a switch of a second half bridge of the inverter to conduct resonant output on a rail of the inverter to the electric machine.

* * * * *